(12) United States Patent
Chang et al.

(10) Patent No.: US 8,120,931 B2
(45) Date of Patent: Feb. 21, 2012

(54) POWER CONVERTER WITH CONTROL CIRCUIT AND RELATED CONTROL METHOD

(75) Inventors: Yuan-Wen Chang, Hsin-Chu (TW); Chun-Teh Chen, Hsin-Chu (TW); Ren-Yi Chen, Hsin-Chu (TW); Yi-Shan Chu, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 543 days.

(21) Appl. No.: 12/272,807

(22) Filed: Nov. 18, 2008

(65) Prior Publication Data

US 2010/0124084 A1 May 20, 2010

(51) Int. Cl.
*H02M 3/335* (2006.01)
(52) U.S. Cl. .............. 363/21.07; 363/21.12; 363/97
(58) Field of Classification Search ............. 363/16–20, 363/21.04, 21.07, 21.09, 21.12, 21.16, 97, 363/131
See application file for complete search history.

(56) References Cited

U.S. PATENT DOCUMENTS

| | | | |
|---|---|---|---|
| 6,940,733 B2 * | 9/2005 | Schie et al. | 363/21.12 |
| 7,027,313 B2 * | 4/2006 | Amei | 363/21.12 |
| 7,400,517 B2 * | 7/2008 | Allinder | 363/21.05 |
| 7,480,159 B2 * | 1/2009 | Wei et al. | 363/21.18 |
| 2006/0055433 A1 * | 3/2006 | Yang et al. | 327/10 |

* cited by examiner

*Primary Examiner* — Rajnikant Patel

(74) *Attorney, Agent, or Firm* — Winston Hsu; Scott Margo

(57) ABSTRACT

A control circuit for use in a power converter has a multi-function terminal, a current comparator circuit, and an under-voltage detection circuit. The current comparator circuit compares current flowing through a power switch of the power converter with a reference value through the multi-function terminal when the power switch is on, and turns the power switch off when the current reaches the reference value. The under-voltage detection circuit determines whether an input voltage of the power converter is less than a predetermined value through the multi-function terminal when the power switch is turned off.

16 Claims, 3 Drawing Sheets

POWER CONVERTER WITH CONTROL CIRCUIT AND RELATED CONTROL METHOD

BACKGROUND OF THE INVENTION

1. Field of the Invention

The present invention relates to control circuits, and particularly, to a control circuit having a multi-function terminal.

2. Description of the Prior Art

Please refer to FIG. 1, which is a diagram of a flyback converter 10. After filtering and current rectification, an input voltage Vin is applied to a primary-side winding Lp of a transformer TX. A power switch 101 is controlled by a pulse width modulation (PWM) control signal Vg. A sense resistor Rs senses a primary-side current Ip flowing through the power switch 101. A control circuit 100 determines duty cycle of the control signal Vg according to a feedback signal Vcomp, which corresponds to an output terminal of the converter 10, and the primary-side current Ip, thereby stabilizing an output voltage Vo.

As is well-known in the art, and shown in FIG. 1, the output voltage Vo on a capacitor Co is generated by rectifying the current through the secondary-side winding of the transformer Tx and a diode D. The feedback compensation signal Vcomp may be generated by using a feedback module 102 to sense the amplitude of the output voltage Vo. Feedback module 102 may include a voltage divider, an optical-coupler, or other device as illustrated in FIG. 1.

Resistors 130 and 140 form a voltage divider. Control circuit 100 utilizes the voltage divider to sense a sense voltage VBNO. Thus, level of the sense voltage VBNO is proportional to the input voltage Vin. When sense voltage VBNO is lower than a predetermined level, control circuit 100 disables switching of power switch 101, so as to prevent converter 10 from operating at too low of an input voltage Vin, which would damage the converter 10.

SUMMARY OF THE INVENTION

According to an embodiment of the present invention, a control circuit for use in a power converter comprises a multi-function terminal, a current comparator circuit, and an under-voltage detection circuit. The current comparator circuit compares current flowing through a power switch of the power converter with a reference value through the multi-function terminal when the power switch is on, and turns the power switch off when the current reaches the reference value. The under-voltage detection circuit determines whether an input voltage of the power converter is less than a predetermined value through the multi-function terminal when the power switch is turned off.

According to the embodiment of the present invention, a power converter comprises a control circuit and a voltage divider circuit. The control circuit comprises a multi-function terminal, a current comparator circuit, and an under-voltage detection circuit. The current comparator circuit compares current flowing through a power switch of the power converter with a reference value through the multi-function terminal when the power switch is on, and turns the power switch off when the current reaches the reference value. The under-voltage detection circuit determines whether an input voltage of the power converter is less than a predetermined value through the multi-function terminal when the power switch is turned off. The voltage divider circuit generates a sense voltage proportional to the input voltage through the multi-function terminal. The under-voltage detection circuit determines whether the input voltage is lower than the predetermined value according to the sense voltage.

According to the embodiment of the present invention, a method of performing control in a power converter comprises providing a multi-function terminal, utilizing the multi-function terminal to compare a current flowing through a power switch of the power converter with a reference value when the power switch is turned on, turning off the power switch when the current reaches the reference value, determining whether an input voltage of the power converter is lower than a predetermined value through the multi-function terminal when the power switch is turned off, and holding the power switch in an off state while the input voltage is lower than the predetermined value.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
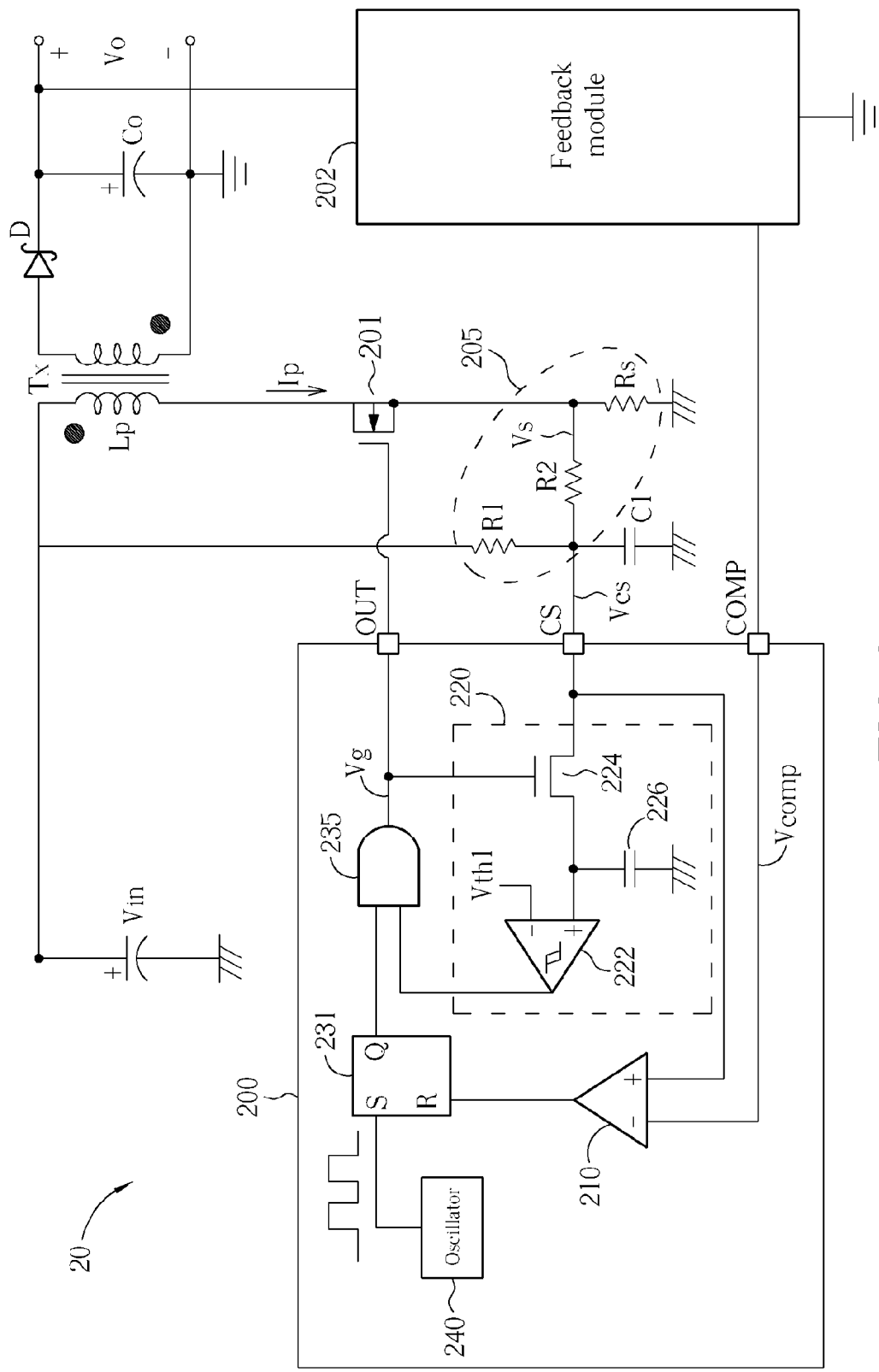
FIG. 2 is a circuit diagram of a power converter according to an embodiment of the present invention.

FIG. 2 is a circuit diagram of a flyback power converter 20 according to an embodiment of the present invention. Power converter 20 comprises a control circuit 200, a power switch 201, and a voltage divider circuit 205. Voltage divider circuit 205 is formed of a first resistor R1, a second resistor R2, and a sense resistor Rs. In this embodiment, resistance of first resistor R1 is much greater than combined resistance of second resistor R2 and sense resistor Rs. After filtering and current rectification, an input voltage Vin is applied to a primary-side winding Lp of a transformer TX. Power switch 201 is controlled by a pulse width modulation (PWM) control signal Vg generated by an oscillator 240. Sense resistor Rs senses a primary-side current Ip flowing through power switch 201. Control circuit 200 determines duty cycle of the control signal Vg according to a feedback signal Vcomp, which corresponds to an output terminal of the converter 20, and the primary-side current Ip, thereby stabilizing an output voltage Vo.

The output voltage Vo on a capacitor Co is generated by rectifying the current through the secondary-side winding of the transformer Tx and a diode D. The feedback compensation signal Vcomp may be generated by using a feedback module 202 to sense the amplitude of the output voltage Vo. Feedback module 202 may include a voltage divider, an optical-coupler, or other device as illustrated in FIG. 2.

Control circuit 200 may be an integrated circuit comprising a multi-function terminal CS, a current comparator circuit 210, and an under-voltage detection circuit 220.

First resistor R1 couples multi-function terminal CS to an input voltage Vin of power converter 20. Second resistor R2 forms a low pass filter with a capacitor C1, and couples sense resistor Rs to multi-function terminal CS. The low pass filter filters out high frequency noise in a first sense voltage Vs generated across sense resistor Rs.

When power switch 201 is on, or conducts, a primary side current Ip of power converter 20 flows through power switch 201 and sense resistor Rs. Thus, the first sense voltage Vs generated across sense resistor Rs (approximately Ip*Rs) is proportional to the primary side current Ip.

While power switch 201 is on, current comparator 210 compares a second sense voltage Vcs and a reference voltage Vcomp. The second sense voltage Vcs is a voltage sensed by multi-function terminal CS, and can be expressed as follows:

$$V_{CS} = Vin \times \left(\frac{R2 + Rs}{R1 + R2 + Rs}\right) + V_S \times \left(\frac{R1}{R1 + R2}\right) \quad (1)$$

Because the resistance of R1 is much greater than the combined resistance of R2 and Rs, the contribution of the input voltage Vin to the equation (1) can be ignored, and the second sense voltage Vcs is approximately equal to the first sense voltage Vs. The reference voltage Vcomp corresponds to a feedback voltage of the output voltage Vo of the power converter 20. Whenever the second sense voltage Vcs reaches the reference voltage Vcomp, current comparator 210 triggers an SR flip-flop 231, such that a logic level of the PWM control signal Vg shifts, taking the power switch 201 out of the conducting state. In other words, when the primary side current Ip reaches or exceeds a reference value, current comparator 210 turns off power switch 201.

Under-voltage detection circuit 220 comprises a comparator 222 and a sample-and-hold circuit comprising a sampling switch 224 and a voltage hold circuit 226. In this embodiment, sampling switch 224 may be an N-type metal-oxide-semiconductor (NMOS) transistor, and voltage hold circuit 226 may be a capacitor.

When power switch 201 is turned off, under-voltage detection circuit 220 detects the second sense voltage Vcs on multi-function terminal CS through first resistor R1. At this time, the second sense voltage Vcs has a value $$Vin \times \left(\frac{R2 + Rs}{R1 + R2 + Rs}\right)$$

proportional to the input voltage Vin. Thus, the second sense voltage Vcs may be used to determine whether the input voltage Vin is lower than a predetermined value.

Sampling switch 224 and power switch 201 are both controlled by the PWM control signal Vg. When power switch 201 is turned off, sampling switch 224 conducts, so that an input terminal of comparator 222 may detect the second sense voltage Vcs. When the second sense voltage Vcs is greater than a reference voltage Vth1, comparator 222 determines that the current input voltage Vin is normal, and outputs a logic high signal. The PWM signal Vg then changes according to the output of SR flip-flop 231. Alternatively, when the second sense voltage Vcs is lower than the reference voltage Vth1, comparator 222 determines that the current input voltage Vin is too low, i.e. an under-voltage condition is met, and outputs a logic low signal, so that the PWM control signal Vg outputted by a logic gate 235 is fixed at a logic low level. Thus, power switch 201 stops switching, and is fixed in an off state.

Whenever power switch 201 conducts, due to isolation by the sampling switch 224, voltage hold circuit 226 will store the second sense voltage Vcs corresponding to the last time the power switch 201 came out of the off state, such that output signal of comparator 222 may remain at the logic high level, and power switch 201 may switch normally.

Because under-voltage detection circuit 220 is only operated when power switch 201 is turned off, operation of current comparator circuit 210 while power switch 201 is conducting is not affected.

Figure 1:
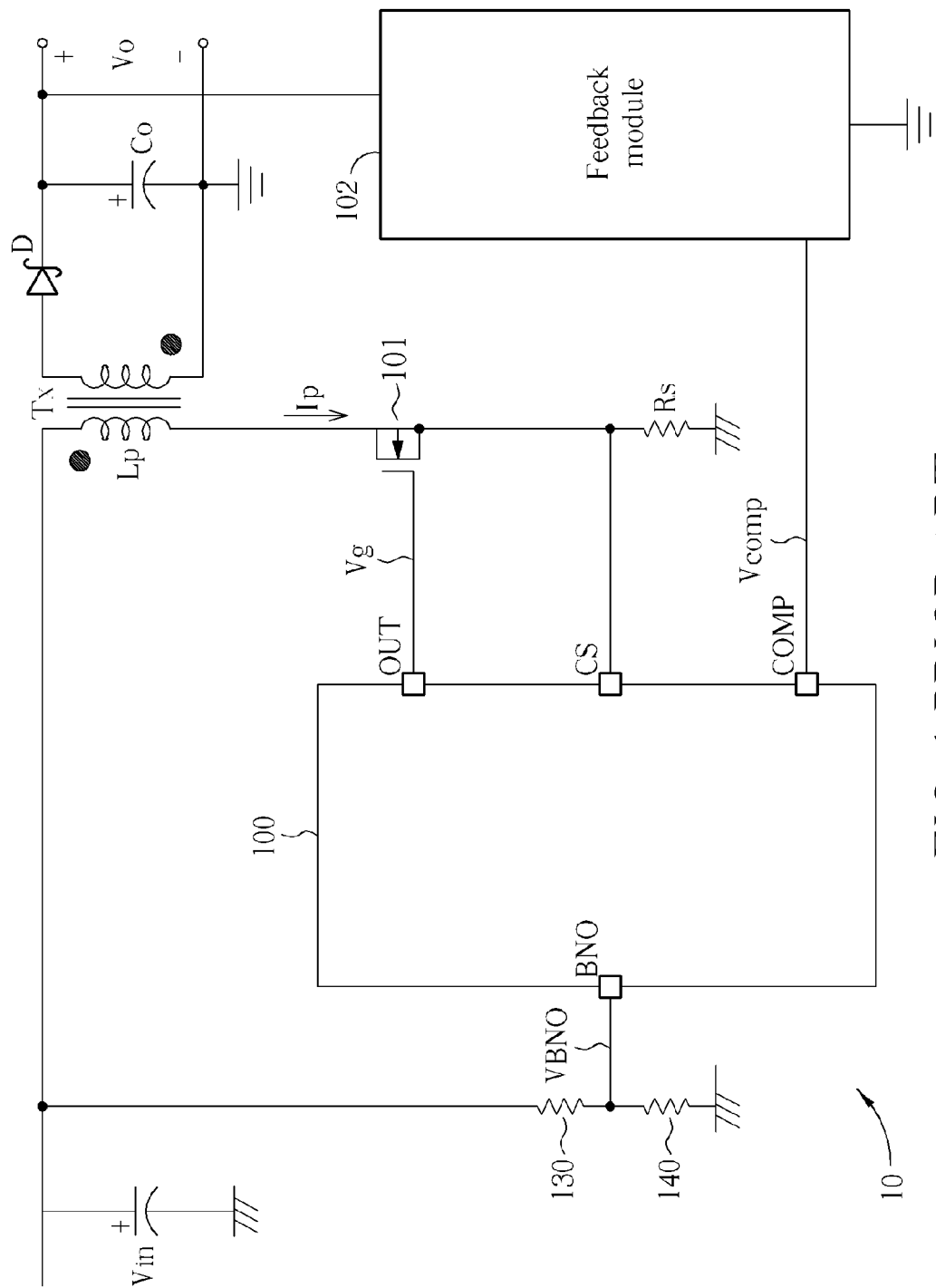
FIG. 1 is a diagram of a flyback converter according to the prior art.

If the embodiment of control circuit 200 is integrated in a chip, under-voltage detection circuit 220 and current comparator circuit 210 may both utilize the same multi-function terminal CS to detect the second sense voltage Vcs, which saves a pin compared to the control circuit 100 shown in FIG. 1.

Figure 3:
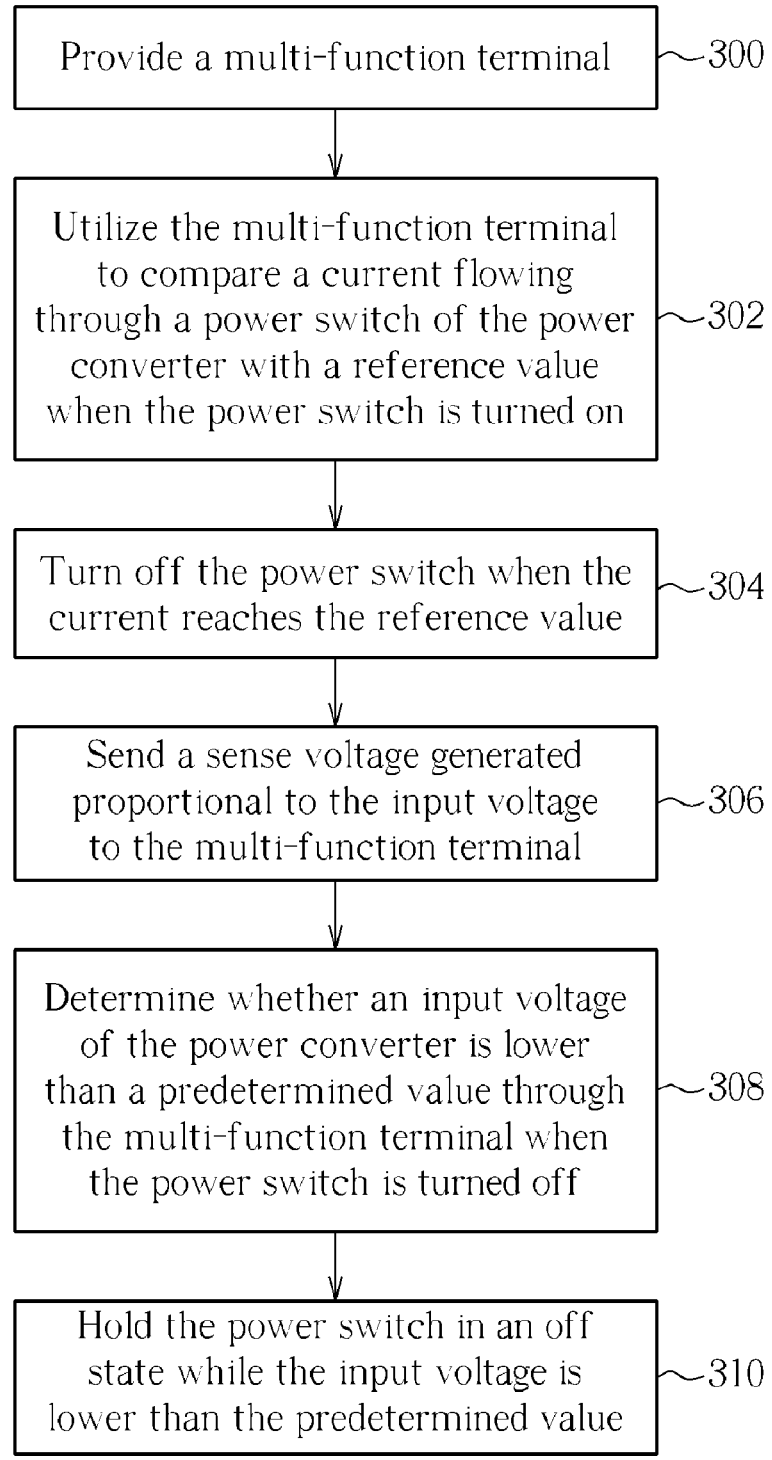
FIG. 3 is a flowchart diagram of a method of controlling a power converter according to the embodiment.

Please refer to FIG. 3, which is a flowchart diagram of a method of controlling a power converter according to the above embodiment. The method of performing PWM control may be derived from the above, and comprises the following steps:

Step 300: Provide a multi-function terminal;

Step 302: Utilize the multi-function terminal to compare a current flowing through a power switch of the power converter with a reference value when the power switch is turned on;

Step 304: Turn off the power switch when the current reaches the reference value;

Step 306: Send a sense voltage generated proportional to the input voltage to the multi-function terminal;

Step 308: Determine whether an input voltage of the power converter is lower than a predetermined value through the multi-function terminal when the power switch is turned off; and Step 310: Hold the power switch in an off state while the input voltage is lower than the predetermined value.

It can be seen from the embodiment of the present invention that use of the PWM control method of FIG. 3 in conjunction with the control circuit 200 of FIG. 2 reduces pin count of the power converter compared to the prior art.

Those skilled in the art will readily observe that numerous modifications and alterations of the device and method may be made while retaining the teachings of the invention.

What is claimed is:

1. A control circuit for controlling a switching power converter comprising a transformer coupled to an input voltage, the transformer controlled by a power switch for charging or discharging to generate an output voltage, the control circuit comprising:
   a multi-function terminal coupled to a source terminal of the power switch and the input voltage simultaneously;
   a current comparator circuit for comparing current flowing through the power switch of the power converter with a reference value through the multi-function terminal when the power switch is on, and for turning the power switch off when the current reaches the reference value; and
   an under-voltage detection circuit for determining whether the input voltage is less than a predetermined value through the multi-function terminal when the power switch is turned off.

2. The control circuit of claim 1, wherein the under-voltage detection circuit comprises a comparator for determining whether the input voltage is lower than the predetermined value.

3. The control circuit of claim 2, wherein the under-voltage detection circuit further comprises a sample-and-hold circuit comprising:
   a voltage hold circuit coupled to the comparator for storing a voltage value; and
   a sampling switch coupled between the voltage hold circuit and the multi-function terminal;

wherein when the power switch is turned off, the sampling switch conducts for the comparator to sample the input voltage.

4. The control circuit of claim 3, wherein the sample-and-hold circuit comprises a capacitor.

5. The control circuit of claim 3, wherein the sample switch is controlled by a pulse width modulated (PWM) control signal.

6. The control circuit of claim 5, further comprising a flip-flop coupled to the current comparator for shifting a logic level of the PWM control signal when the second sense voltage reaches the reference voltage for taking the power switch out of the conducting state.

7. The control circuit of claim 6, further comprising a logic gate coupled to the flip-flop and the comparator for fixing the PWM control signal at a logic low level when the comparator determines that the input voltage is too low.

8. A power converter comprising:
a transformer coupled to an input voltage and controlled by a power switch for charging or discharging to generate an output voltage;
a voltage divider circuit coupled to a source terminal of the power switch and the input voltage for generating a sense voltage proportional to the input voltage; and
a control circuit comprising:
a multi-function terminal coupled to the voltage divider circuit to receive the sense voltage;
a current comparator circuit for comparing current flowing through a power switch of the power converter with a reference value through the multi-function terminal when the power switch is on, and for turning the power switch off when the current reaches the reference value; and
an under-voltage detection circuit for determining whether an input voltage of the power converter is less than a predetermined value through the multi-function terminal when the power switch is turned off;
wherein the under-voltage detection circuit determines whether the input voltage is lower than the predetermined value according to the sense voltage.

9. The power converter of claim 8, wherein the voltage divider circuit comprises:
a current sense resistor coupled to the power switch; and
a first resistor having a first end for receiving the input voltage and a second end coupled to the multi-function terminal.

10. The power converter of claim 9, wherein the voltage divider circuit further comprises a second resistor having a first end coupled to the current sense resistor, and a second end coupled to the multi-function terminal.

11. The control circuit of claim 9, wherein the under-voltage detection circuit comprises a comparator for determining whether the input voltage is lower than the predetermined value.

12. The control circuit of claim 11, wherein the under-voltage detection circuit further comprises a sample-and-hold circuit comprising:
a voltage hold circuit coupled to the comparator for storing a voltage value; and
a sampling switch coupled between the voltage hold circuit and the multi-function terminal;
wherein when the power switch is turned off, the sampling switch conducts for the comparator to sample the input voltage.

13. The control circuit of claim 12, wherein the sample-and-hold circuit comprises a capacitor.

14. The control circuit of claim 12, wherein the sample switch is controlled by a pulse width modulated (PWM) control signal.

15. The power converter of claim 14, further comprising a flip-flop coupled to the current comparator for shifting a logic level of the PWM control signal when the second sense voltage reaches the reference voltage for taking the power switch out of the conducting state.

16. The control circuit of claim 15, further comprising a logic gate coupled to the flip-flop and the comparator for fixing the PWM control signal at a logic low level when the comparator determines that the input voltage is too low.

* * * * *